United States Patent
Lee et al.

(10) Patent No.: US 11,433,535 B2
(45) Date of Patent: Sep. 6, 2022

(54) SERIES ELASTIC ACTUATOR

(71) Applicant: DAEGU GYEONGBUK INSTITUTE OF SCIENCE AND TECHNOLOGY, Daegu (KR)

(72) Inventors: Hee Don Lee, Daegu (KR); Tae Hun Kang, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 0 days.

(21) Appl. No.: 17/370,148

(22) Filed: Jul. 8, 2021

(65) Prior Publication Data

US 2022/0063088 A1 Mar. 3, 2022

(30) Foreign Application Priority Data

Sep. 1, 2020 (KR) .......................... 10-2020-0111260

(51) Int. Cl.
*B25J 9/12* (2006.01)
*B25J 17/02* (2006.01)

(52) U.S. Cl.
CPC ............. *B25J 9/126* (2013.01); *B25J 17/025* (2013.01)

(58) Field of Classification Search
CPC ................................ B25J 9/126; B25J 17/025
USPC ....................................................... 74/490.01
See application file for complete search history.

(56) References Cited

U.S. PATENT DOCUMENTS 8,686,680 B2 4/2014 Deegan
9,239,100 B1* 1/2016 Weber ...................... B25J 9/102
2011/0067517 A1* 3/2011 Ihrke ...................... B25J 17/025
74/490.03
2012/0312114 A1* 12/2012 Deegan ................... F16H 57/12
74/409
2013/0330198 A1* 12/2013 Farineau ................. F01D 5/326
416/220 R

FOREIGN PATENT DOCUMENTS

| CN | 205674198 | | 11/2016 | |
|----|-----------|----|---------|----|
| EP | 1726412 | A1 * | 11/2006 | .......... B25J 19/0016 |
| ES | 2387228 | A1 * | 9/2012 | ............ B25J 19/068 |
| KR | 10-1785067 | | 10/2017 | |
| WO | WO-2015095211 | A2 * | 6/2015 | ............. A61F 2/605 |

OTHER PUBLICATIONS

Hian Kai Kwa et al., "Development of the IHMC Mobility Assist Exoskeleton", 2009 IEEE International Conference on Robotics and Automation, May 12-17, 2009.

* cited by examiner

*Primary Examiner* — Jake Cook
*Assistant Examiner* — T. Scott Fix
(74) *Attorney, Agent, or Firm* — Lex IP Meister, PLLC

(57) ABSTRACT

A series elastic actuator includes a first body, a motor, a pulley, a second body, a wire, a first adjuster, a second adjuster, a first spring, and a second spring. The wire is curved around a seat portion of the pulley, a first extending portion of the wire and the first adjuster are elastically supported with respect to the second body by the first spring, and the second extending portion of the wire and the second adjuster are elastically supported with respect to the second body by the second spring. When an external load is applied to the second body and relative rotation is generated between the pulley and the second body, a moment arm by the load is constant and the external load can be measured on the basis of the measured relative rotation angle and the spring constants of the first spring and the second spring.

9 Claims, 11 Drawing Sheets

SERIES ELASTIC ACTUATOR

CROSS-REFERENCE TO RELATED APPLICATION

This present application claims benefit of priority to Korean Patent Application No. 10-2020-0111260, entitled "Series Elastic Actuator," filed on Sep. 1, 2020, in the Korean Intellectual Property Office, the entire disclosure of which is incorporated herein by reference.

FIELD

The present disclosure relates to a series elastic actuator and, more particularly, to a rotary series elastic actuator.

BACKGROUND

A series elastic actuator (SEA) is a device in which an elastic component such as a spring is coupled between loads connected to an actuator in series.

In relation to such a series elastic actuator, an embodiment related to a rotary series elastic actuator is disclosed in U.S. Patent Registration No. 9,239,100B1. The series elastic actuator according to this U.S. Patent includes a motor, a transmission assembly, an output plate, a rotary bearing, a housing, a rotary sensor, a string, and springs. The springs are connected between the bottom plate of the housing and the transmission assembly.

The series elastic actuator disclosed in U.S. Pat. No. 9,239,100B1 can be applied to a robotic system including a pair of robotic arm links connected at a joint. The housing may be fixed to one arm link (first arm link) and the output plate of the transmission assembly may be connected to another arm link (second arm link).

According to U.S. Pat. No. 9,239,100B1, when the second arm link is rotated with respect to the first arm link by an external force applied to the second arm link, one spring is stretched, another spring is compressed, and the string is moved, and a generated torque can be measured by the sensor.

However, according to the series elastic actuator having such a structure disclosed in U.S. Pat. No. 9,239,100B1, since a spring is connected between the output end of the transmission assembly and an arm link (second arm link), when the spring is deformed, the spring bends or rotates, and a moment arm acting about the joint of the arm link changes.

PRIOR ART DOCUMENT

Patent Document (Patent Document 1) U.S. Patent Registration No. U.S. Pat. No. 9,239,100B1 (2016.01.19)

SUMMARY

The present disclosure is directed to providing a rotary series elastic actuator in which an angle depending on relative rotation may be directly measured without a moment arm being changed when an external force is applied to a load and relative rotation is generated between a motor and the load.

The present disclosure is further directed to providing a rotary series elastic actuator in which an acting torque may be measured by checking the relative rotation angle when an external force is applied to a load and relative rotation is generated between a motor and the load.

The present disclosure is further directed to providing a rotary series elastic actuator in which an accurate torque may be measured even when a member connecting an actuator (a motor) and a load in cooperation with an elastic member (a spring) is generated.

The present disclosure is further directed to providing a rotary series elastic actuator having a structure in which stable coupling and relative movement (relative rotation) may be made between two bodies rotating with respect to each other.

A series elastic actuator according to an aspect of the subject matter described herein is a rotary series elastic actuator.

The series elastic actuator may be applied to a joint of a robot. The series elastic actuator described herein may be a rotary series elastic actuator for robot joints.

The series elastic actuator includes a first body, a motor, a pulley, a second body, a wire, a first adjuster, a second adjuster, a first spring, and a second spring.

In some embodiments, the first body and the second body are combined so as to be rotatable about a first rotation axis.

The motor includes a stator and a rotor. The motor may be a DC motor, an AC motor, a synchronous motor, an induction motor, a BLDC motor, a step motor, or the like.

The stator of the motor is fixed to the first body. Accordingly, when the motor is operated, the rotor of the motor is rotated with respect to the first body.

The pulley is configured to rotate about the first rotation axis when the rotor is rotated.

In some embodiments, the first rotation axis may be a rotary shaft of the motor. That is, the rotor of the motor may be rotated about the first rotation axis.

The pulley has a seat portion.

The seat portion forms an arc around the first rotation axis. The seat portion may form a complete circle or may form a portion of a circle. The seat portion may form a continuous arc or a discontinuous arc around the first rotation axis.

In some embodiments, the seat portion is a recessed groove. The seat portion is a recessed curved surface and forms a circle or an arc around the first rotation axis.

In some embodiments, the pulley has a fixing groove.

The fixing groove is a groove recessed toward the first rotation axis on the seat portion. The fixing groove is positioned closer to the first rotation axis than the seat portion.

The second body is configured to be rotatable about the first rotation axis.

When the series elastic actuator is operated, the second body may be rotated with the pulley. That is, the second body and the pulley are rotated together with respect to the first body, and in this case, relative rotation may not be generated between the second body and the pulley.

When the series elastic actuator is operated, the second body may be rotated with respect to the pulley.

The wire is a relatively long wire. The wire may be made of metal or may include metal. The wire may include a steel wire and may be formed by gathering a plurality of steel wires.

The wire may have a uniform or substantially uniform cross-section in the longitudinal direction.

The wire may be bent.

When the series elastic actuator is operated, the wire may be very slightly stretched or contracted in the longitudinal direction. When the series elastic actuator is operated, the longitudinal tensile strain of the wire may be 0.1 or less, or the longitudinal tensile strain may be 0.01 or less.

The wire has a center portion, a first extending portion, and a second extending portion.

The center portion, the first extending portion, and the second extending portion are integrated with one another.

The center portion forms the middle portion of the wire.

The first extending portion extends from any one end of the center portion, and the second extending portion extends from the other end of the center portion. That is, the first extending portion and the second extending portion extend in opposite directions to each other with respect to the center portion.

The center portion is a portion that is curved around the seat portion. The center portion may be at least partially curved in an arc shape in close contact with the circumference of the seat portion.

The center portion is inserted into the seat portion that is a recessed groove. The depth of the seat portion may be the same as the diameter of the wire or may be larger or smaller than the diameter of the wire.

The first extending portion forms a straight line.

The second extending portion forms a straight line.

The first extending portion and the second extending portion may be parallel to each other.

The wire has a first connecting portion and a second connecting portion. The first connecting portion and the second connecting portion may be integrated with the center portion, the first extending portion, and the second extending portion.

The first connecting portion is a portion connecting the center portion and the first extending portion. That is, the center portion, the first connecting portion, and the first extending portion are sequentially connected.

For operation of the series elastic actuator, the first connecting portion may be straight or may be curved, or a portion thereof may be straight and the other portion thereof may be curved.

The second connecting portion is a portion connecting the center portion and the second extending portion. That is, the center portion, the second connecting portion, and the second extending portion are sequentially connected.

For operation of the series elastic actuator, the second connecting portion may be straight or may be curved, or a portion thereof may be straight and the other portion thereof may be curved.

The first adjuster is coupled to the first extending portion to move with the first extending portion. The first adjuster may be coupled and fixed to the first extending portion.

The second adjuster is coupled to the second extending portion so as to move with the second extending portion. The second adjuster may be coupled and fixed to the second extending portion.

The first spring elastically supports the first adjuster from the second body such that the wire is pulled, and is coupled to the series elastic actuator in a pre-pressed state. The first spring may be a coil spring.

The second spring elastically supports the second adjuster from the second body such that the wire is pulled, and is coupled to the series elastic actuator in a pre-pressed state. The second spring may be a coil spring.

In some embodiments, the wire has a fixing portion. The fixing portion is inserted into the fixing groove at the center of the center portion. The fixing portion is inserted into the fixing groove while being curved or bent at the center portion differently from the curve (arc) formed by the center portion.

In some embodiments, the series elastic actuator includes a fixing pin. The fixing pin is fastened to the pulley at the fixing groove in close contact with the fixing portion such that the fixing portion is fixed in the fixing groove.

In some embodiments, the first adjuster includes a first tensioner, a first wire-fixing member, and a first adjustment nut. The first adjuster may include a first auxiliary nut.

The first tensioner has a first neck, a first head, and a first center hole.

The first neck is inserted into the first spring, which is a coil spring. A thread may be formed on the outer circumferential surface of the first neck.

The first head is formed such that the diameter thereof increases outside the first neck.

The first center hole is a hole formed through the first neck and the first head.

The first wire-fixing member is fastened to the first head while pressing an end portion of the wire such that the wire inserted into the first center hole and protruding out of the first head is fixed to the first head.

The first adjustment nut is screwed to the outer circumferential surface of the first neck. The first spring is supported with one end thereof in contact with the first adjustment nut.

In some embodiments, the second adjuster includes a second tensioner, a second wire-fixing member, and a second adjustment nut. The second adjuster may include a second auxiliary nut.

The second tensioner has a second neck, a second head, and a second center hole.

The second neck is inserted into the second spring, which is a coil spring. A thread may be formed on the outer circumferential surface of the second neck.

The second head is formed such that the diameter thereof increases outside the second neck.

The second center hole is a hole formed through the second neck and the second head.

The second wire-fixing member is fastened to the second head, while pressing an end portion of the wire such that the wire inserted into the second center hole and protruding out of the second head is fixed to the second head.

The second adjustment nut is screwed to the outer circumferential surface of the second neck. The second spring is supported with one end thereof in contact with the second adjustment nut.

The series elastic actuator includes a first adjustment housing and a second adjustment housing.

The first adjustment housing is coupled to the second body, has the first extending portion passing through the center thereof, and is configured to accommodate the first spring, the first neck, and the first adjustment nut.

In some embodiments, the first adjustment housing may be coupled and fixed to the second body.

In some embodiments, the first adjustment housing may be fixed to the second body so as to be rotatable about the first extending portion.

The second adjustment housing is coupled to the second body, has the second extending portion passing through the center thereof, and is configured to accommodate the second spring, the second neck, and the second adjustment nut.

In some embodiments, the second adjustment housing may be coupled and fixed to the second body.

In some embodiments, the second adjustment housing may be fixed to the second body so as to be rotatable about the second extending portion.

The series elastic actuator includes a reducer.

The reducer may be configured to rotate about the first rotation axis.

The reducer connects the rotor and the pulley. That is, the reducer transmits torque from the rotor to the pulley, and the rotation speed of the rotor is decreased through the reducer and then transmitted to the pulley.

The reducer may include a harmonic gearing.

The first body may include a first inner case, a second inner case, and a first bracket.

The first inner case and the second inner case form a housing in cooperation with each other. That is, the first inner case and the second inner case form a first housing in cooperation with each other.

The first inner case and the second inner case may be coupled and fixed to each other, thereby forming the first housing.

The first housing has an internal space, and the motor is accommodated in the internal space of the first housing.

The first bracket may be fixed inside the first inner case and/or the second inner case, or may be integrated with the first inner case or the second inner case.

The first bracket protrudes outward from the first inner case or the second inner case.

The series elastic actuator may be coupled and fixed to another device (e.g., links (or arms) connected through joints of a robot) through the first bracket.

The second body may include a first outer case, a second outer case, and a second bracket.

The first outer case is positioned at any one side of the first housing, at an opposite side to the pulley with respect to the first housing.

The second outer case is positioned at an opposite side to the first outer case with respect to the pulley, and is fixedly coupled to the first outer case.

The first outer case, the second outer case, and the second bracket form a housing in cooperation with one another.

The first outer case, the second outer case, and the second bracket may be coupled and fixed to each other, thereby forming a second housing.

The second housing has an internal space, and the first housing is accommodated in the internal space of the second housing. The first inner case and the second inner case are positioned between the first outer case and the second outer case.

The second bracket may be fixed to the first outer case and/or the second outer case, or may be integrated with the first outer case or the second outer case.

The second bracket protrudes outward from the first outer case or the second outer case.

The series elastic actuator may be coupled and fixed to another device (e.g., links (or arms) connected through joints of a robot) through the second bracket.

The series elastic actuator may include a first bearing and a second bearing.

The bearings described in embodiments of the present disclosure may be radial bearings or thrust bearings. The bearings described in embodiments of the present disclosure may be ball bearings or roller bearings.

The first bearing is coupled between the first housing and the first outer case.

The second bearing is coupled between the pulley and the second outer case.

The series elastic actuator includes a first encoder and a second encoder.

The encoders described in embodiments of the present disclosure may be common encoders. The encoders are electronic devices that measure motion or position, and each may be configured to measure whether specific components are rotated, rotational angles thereof, etc. in embodiments of the present disclosure.

The first encoder may be fixed to the first housing to sense rotation of the rotor.

The second encoder may be disposed inside the second outer case to measure the rotation angle between the pulley and the second body.

In an embodiment, the fixing portion of the wire is fixed in the fixing groove of the pulley, the center portion of the wire is curved around the seat portion, and the first extending portion and the second extending portion respectively extend in a straight line from each end of the center portion and are coupled to the second body through the first adjuster and the second adjuster. When an external force (an external force acting to rotate the second body about the first rotation axis with respect to the first body) is applied to the second body, the pulley and the second body are rotated with respect to each other. In this case, any one of the first spring and the second spring is compressed and the other one thereof is stretched, and the first extending portion and the second extending portion are moved in the directions defined by the lines thereof, respectively. It is possible to measure a torque due to the external force by checking the spring constants of the first spring and the second spring, and the relative rotation angle. When torque is generated around the first rotation axis, described above, in the series elastic actuator according to embodiments of the present disclosure, there is no sliding between the wire and the pulley, the moment arm is constant, an angle due to relative rotation may be directly measured, and the torque may be accurately and easily measured.

In an embodiment, it is possible to adjust the degree of compression of the first spring by rotating the first tensioner with respect to the first adjustment nut in the first adjuster, and it is possible to adjust the degree of compression of the second spring by rotating the second tensioner with respect to the second adjustment nut in the second adjuster. Accordingly, it is possible to adjust the magnitudes of the tension acting in the first extending portion and the second extending portion of the wire to be the same as each other, and it is also possible to adjust the magnitudes to be different from each other. It is possible to measure the acting torque by checking the relative rotation angle between the pulley and the second body by adjusting the first adjuster and the second adjuster so that the magnitudes of the tension acting in the first extending portion and the second extending portion of the wire are the same as each other, without a specific external force being applied to the series elastic actuator.

In an embodiment, the first adjustment housing may be coupled to the second body so as to be rotatable about the first extending portion, and the second adjustment housing may be coupled to the second body so as to be rotatable about the second extending portion. In addition, the first adjuster may be rotated about the first extending portion and the second adjuster may be rotated about the second extending portion. Accordingly, it is possible to remove or reduce limitations in terms of installation, assembly, etc. of a rotary series elastic actuator, and to measure an accurate torque.

In an embodiment, the first bearing is coupled between the first housing and the first outer case to enable relative rotation of the first housing and the first outer case, and the second bearing is coupled between the pulley and the second outer case to enable relative rotation of the pulley and the second outer case. Accordingly, stable coupling and relative rotation may be made between the first body and the second body rotating with respect to each other.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
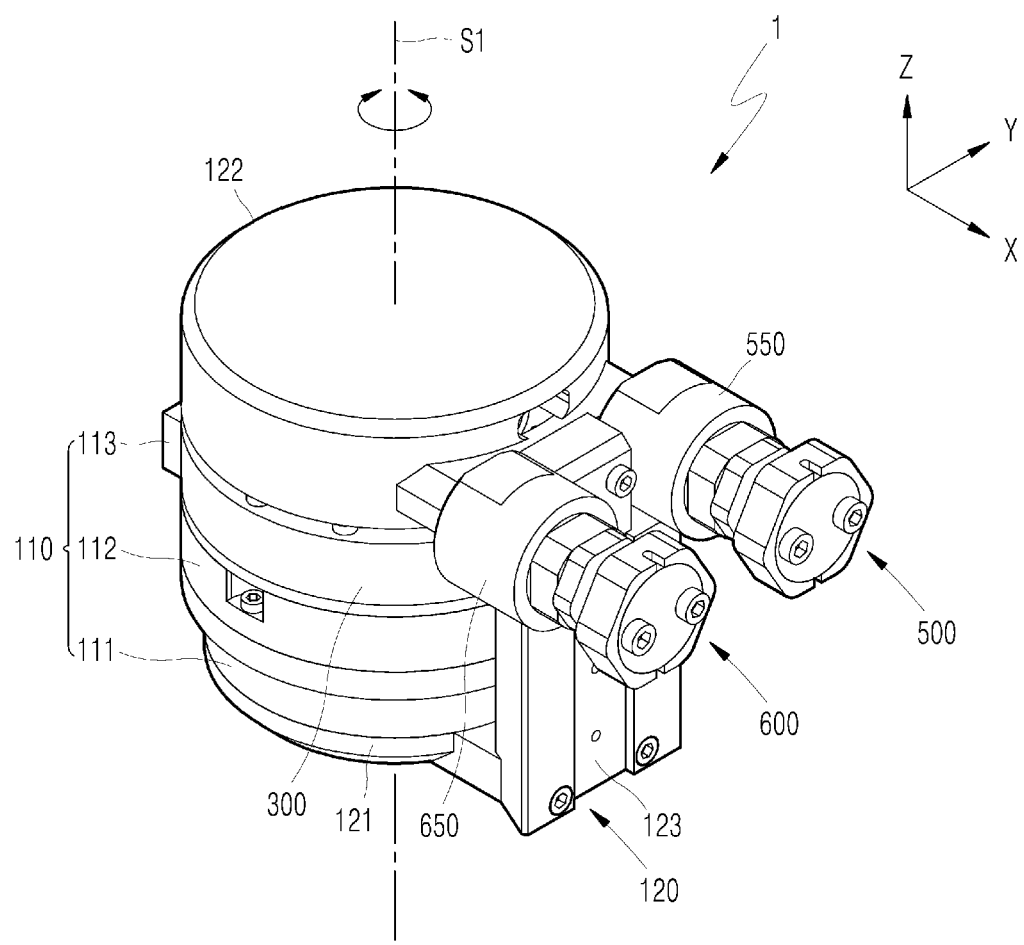
FIG. 1 is a perspective view showing a series elastic actuator according to an embodiment of the present disclosure.

Hereafter, embodiments of the present disclosure are described in detail with reference to the accompanying drawings to describe the present disclosure in more detail. Like reference numerals indicate the same components throughout the detailed description.

A first direction X, a second direction Y, and a third direction Z shown in the accompanying drawings are directions orthogonal to one another. In the description of a series elastic actuator 1 and components thereof, respective directions are based on a state in which a specific external force is not applied to the series elastic actuator 1 (there is no relative rotation between a first body 110 and a second body 120), unless specifically limited.

FIG. 1 is a perspective view showing a series elastic actuator 1 according to an embodiment of the present disclosure.

Figure 2:
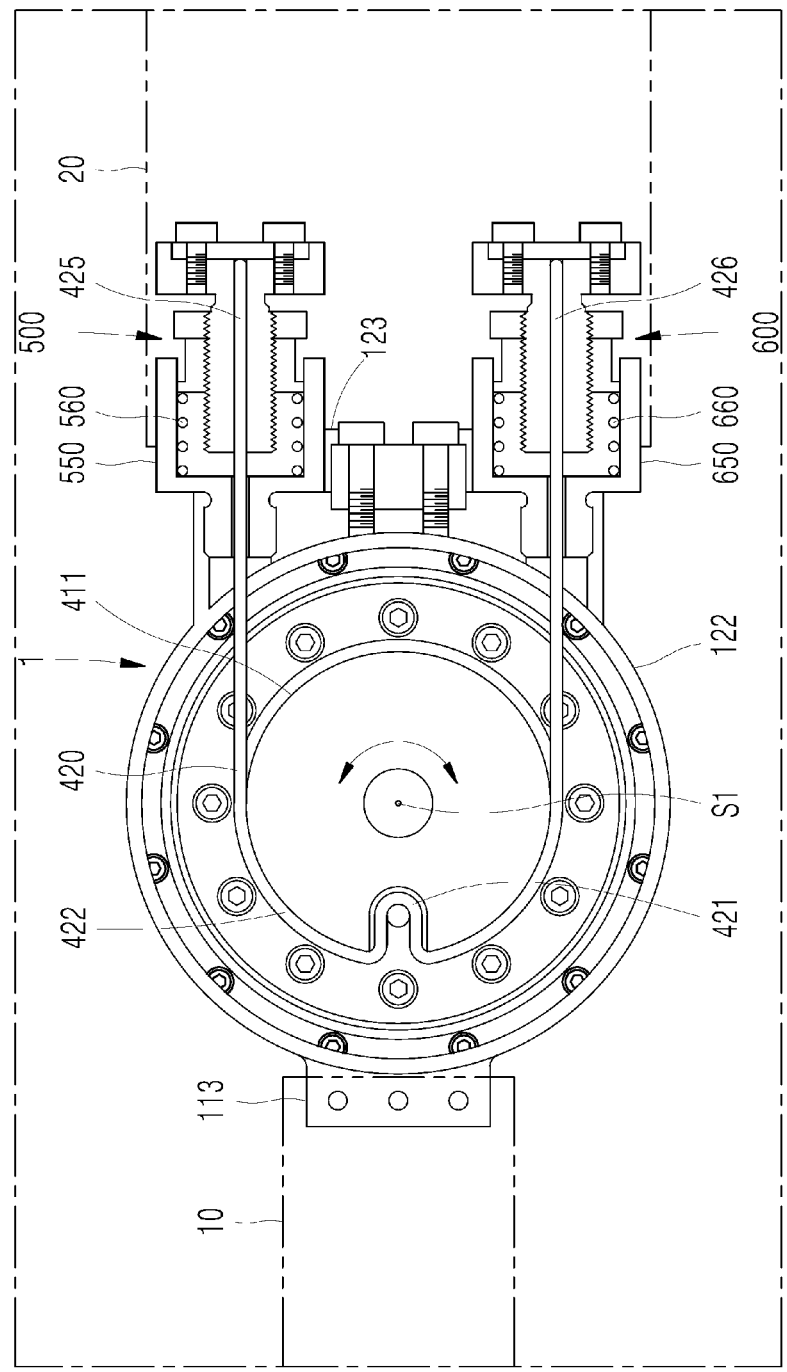
FIG. 2 is a cross-sectional view schematically showing a use state of the series elastic actuator shown in FIG. 1.

FIG. 2 is a cross-sectional view schematically showing a use state of the series elastic actuator 1 shown in FIG. 1.

Figure 3:
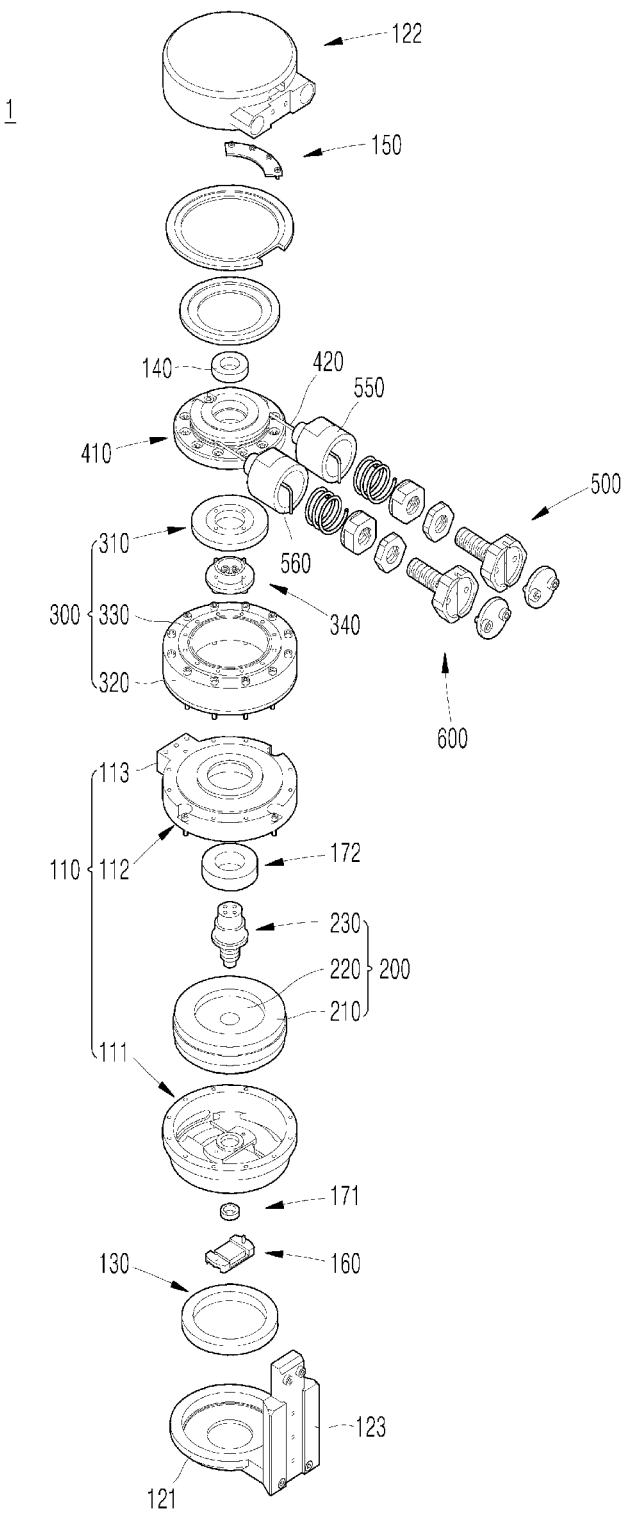
FIG. 3 is an exploded perspective view showing the series elastic actuator shown in FIG. 1.
Figure 4:
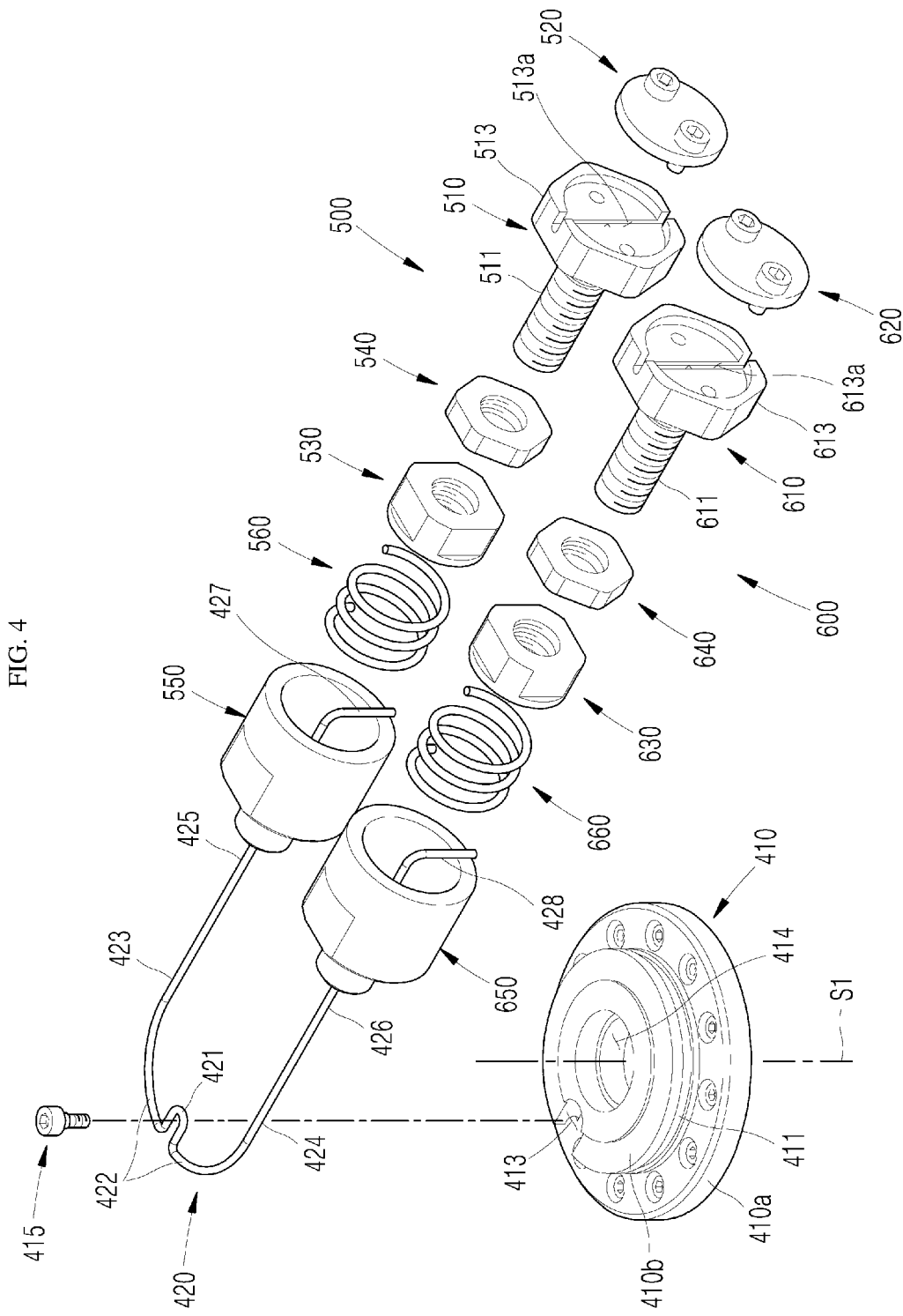
FIG. 4 is an exploded perspective view showing some components of the series elastic actuator of FIG. 3.

FIG. 3 is an exploded perspective view showing the series elastic actuator 1 shown in FIG. 1 and FIG. 4 is an exploded perspective view showing some components of the series elastic actuator 1 of FIG. 3.

Figure 5A:
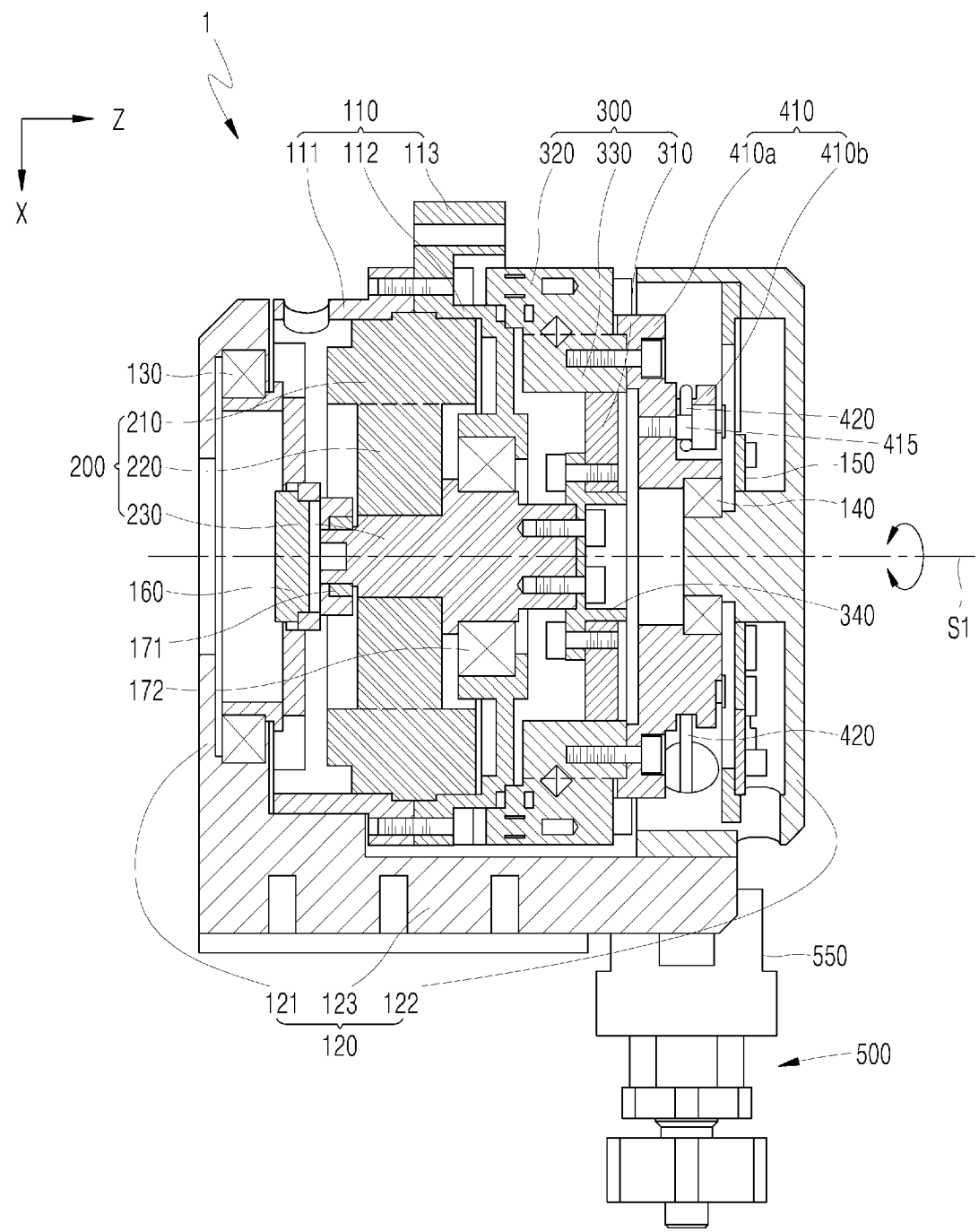
FIG. 5A is a cross-sectional view showing the series elastic actuator shown in FIG. 1.
Figure 5B:
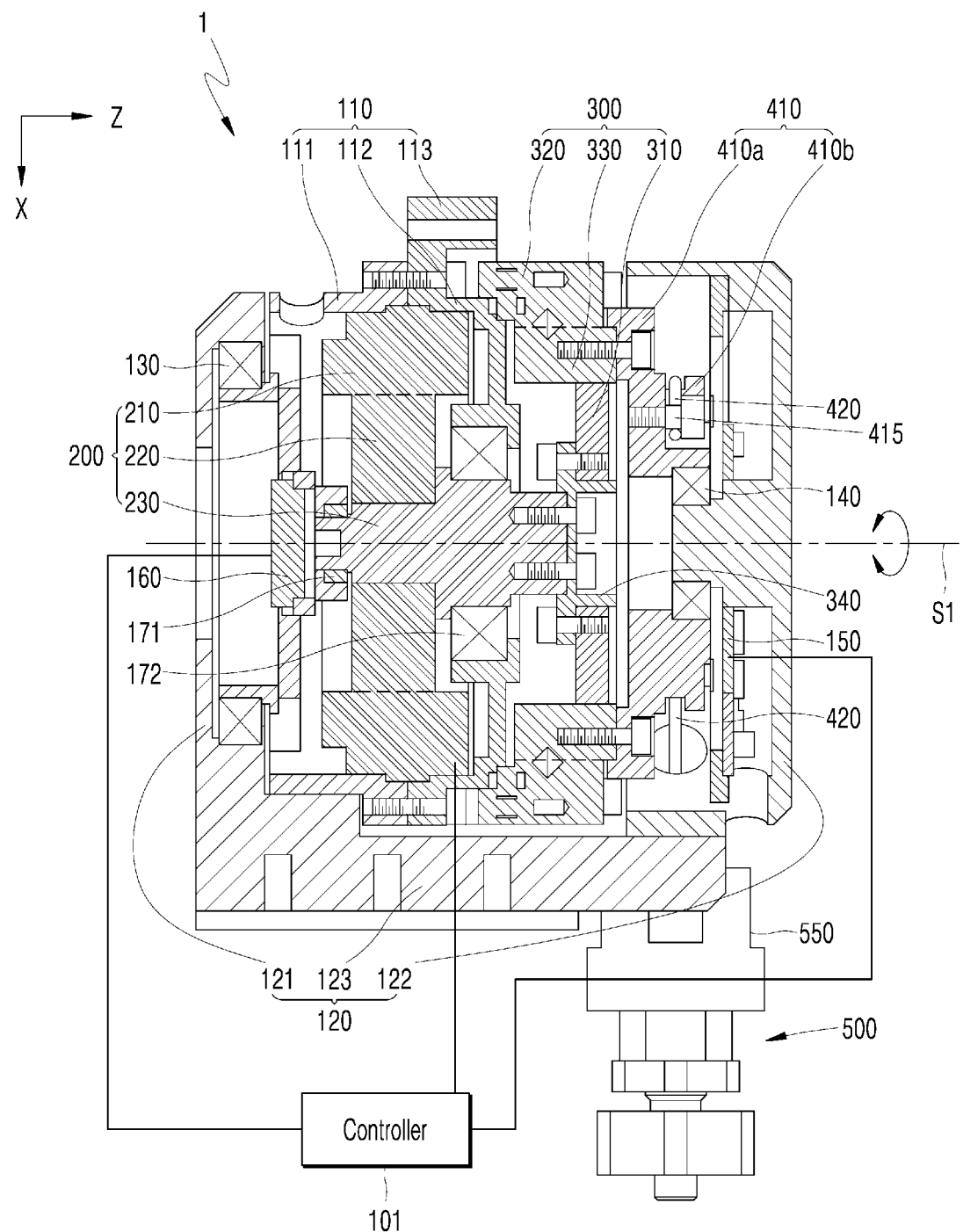
FIG. 5B is a view conceptually and schematically showing the relationship between a controller and components of a series elastic actuator.

FIG. 5A is a cross-sectional view showing the series elastic actuator 1 shown in FIG. 1 and FIG. 5B is a view conceptually and schematically showing the relationship between a controller 101 and components of the series elastic actuator 1.

The series elastic actuator 1 according to an embodiment of the present disclosure is a rotary series elastic actuator.

The series elastic actuator 1 may be applied to joints of a robot. A robot according to an embodiment may include two arms (a first arm 10 and a second arm 20), and the first arm 10 and the second arm 20 may be configured to relatively rotate about a rotation axis.

The series elastic actuator 1 may include a first body 110, a motor 200, a wheel 410, a second body 120, a wire 420, a first adjuster 500, a second adjuster 600, a first spring 560, and a second spring 660.

The series elastic actuator 1 may include a reducer 300, a first encoder 150, a second encoder 160, a first bearing 130, and a second bearing 140.

The first body 110 and the second body 120 are coupled to each other so as to be rotatable about a first rotation axis S1.

The first body 110 and the second body 120 may form the entire outer shape of the series elastic actuator 1, and are formed to be hard so as to be able to support other components of the series elastic actuator 1. Components of the series elastic actuator 1 may be coupled and fixed to the first body 110 or the second body 120, or may be coupled to the first body 110 or the second body 120 so as to move with respect to the first body 110 or the second body 120.

The first body 110 may include a first inner case 111, a second inner case 112, and a first bracket 113.

The first inner case 111 and the second inner case 112 form a housing-shaped first housing 111, 112 in cooperation with each other.

The first inner case 111 and the second inner case 112 are coupled and fixed to each other, whereby they may form the first housing 111, 112. The first inner case 111 and the second inner case 112 may be formed in circular shapes around the first rotation axis S1.

The first housing 111, 112 has an internal space, and the motor 200 is accommodated in the internal space of the first housing 111, 112.

The first housing 111, 112 may be formed in a circular shape around the first rotation axis S1, and has a predetermined length in the longitudinal direction of the first rotation axis S1.

The first bracket 113 may be fixed to the first inner case 111 or may be fixed to the second inner case 112. The first bracket 113 may be integrated with the first inner case 111 or the second inner case 112.

The first bracket 113 protrudes outward from the first inner case 111 or the second inner case 112.

When the series elastic actuator 1 is applied to a joint of a robot, the first bracket 113 may be coupled and fixed to the first arm 10.

The second body 120 may include a first outer case 121, a second outer case 122, and a second bracket 123.

The first outer case 121 is positioned on any one side of the first housing 111, 112, at the opposite side to the wheel 410 (a pulley 410b) with the first housing 111, 112 therebetween. The first outer case 121 may be positioned outside the first inner case 111. The first outer case 121 may be formed in a circular shape around the first rotation axis S1.

The second outer case 122 is positioned at the opposite side to the first outer case 121 with the wheel 410 (the pulley 410b) therebetween and is fixed to the first outer case 121. The second outer case 122 may be positioned outside the pulley 410b. The second outer case 122 may be formed in a circular shape around the first rotation axis S1.

The first outer case 121, the second outer case 122, and the second bracket 123 form a housing-shaped second housing 121, 122, 123 in cooperation with each other.

The first outer case 121, the second outer case 122, and the second bracket 123 are coupled and fixed to one another, thereby forming the second housing.

The second housing has an internal space, and the first housing 111, 112 is accommodated in the internal space of the second housing. The first inner case 111 and the second inner case 112 are positioned between the first outer case 121 and the second outer case 122. The first housing 111, 112 (also including the motor 200 coupled inside the first housing 111, 112), the reducer 300, and the wheel 410 (the pulley 410b) are positioned between the first outer case 121 and the second outer case 122.

The second housing may be formed in a circular shape around the first rotation axis S1, and has a predetermined length in the longitudinal direction of the first rotation axis S1.

The second bracket 123 may be fixed to the first outer case 121 and/or the second outer case 122, or may be integrated with the first outer case 121 or the second outer case 122.

The second bracket 123 protrudes outward from the first outer case 121 or the second outer case 122.

When the series elastic actuator 1 is applied to a joint of a robot, the second bracket 123 may be coupled and fixed to the second arm 20.

When the series elastic actuator 1 is applied to a joint of a robot, the first arm 10 and the second arm 20 may rotate with respect to each other around the first rotation axis S1.

The motor 200 according to an embodiment of the present disclosure may be a DC motor, an AC motor, a synchronous motor, an induction motor, a BLDC motor, a step motor, or the like.

The motor 200 may include a stator 210, a rotor 220, and a rotary shaft 230. The rotary shaft 230 is fixed at the center of the rotor 220 and rotates with the rotor 220.

The stator 210 of the motor 200 is fixed to the first body 110 inside the first body 110, and when the motor 200 is operated, the rotor 220 and the rotary shaft 230 are rotated with respect to the first body 110. The rotor 220 and the rotary shaft 230 are rotated about the first rotation axis S1.

The stator 210 and the rotor 220 of the motor 200 are accommodated inside the first body 110, and the rotary shaft 230 protrudes out of the first body 110 and is coupled and fixed to the reducer 300.

The rotary shaft 230 may be rotatably supported on both axial sides by the first housing 111, 112. To this end, the series elastic actuator 1 may include a first inner bearing 171 and a second inner bearing 172.

The first inner bearing 171 and the second inner bearing 172 each have the first rotation axis S1 as their central axes.

The first inner bearing 171 is coupled between the first inner case 111 and the rotary shaft 230, and the second inner bearing 172 is coupled between the second inner case and the rotary shaft 230.

The reducer 300 may be an assembly of gears rotating in mesh with each other. At least some of the components of the reducer 300 may rotate about the first rotation axis S1.

The reducer 300 connects the rotor 220 of the motor 200 and the wheel 410 (the pulley 410b) to each other. The reducer 300 connects the rotary shaft 230 of the motor 200 and the wheel 410 (the pulley 410b) to each other. The reducer 300 transmits torque from the rotor 220 (the rotary shaft 230) to the wheel 410 (the pulley 410b), and the rotational speed of the rotor 220 (the rotary shaft 230) is decreased through the reducer 300 and then transmitted to the wheel 410 (the pulley 410b).

In an embodiment, the reducer 300 may be a planetary gear system.

In another embodiment, the reducer 300 may be a harmonic gearing (a strain wave gearing).

When the reducer 300 is a harmonic gearing, the reducer 300 may include a wave generator 310, a flex spline 330, and a circular spline 320.

Teeth engaged with each other are formed on the flex spline 330 and the circular spline 320, respectively.

The wave generator 310 may be formed in an elliptical shape, and is fixed to the rotary shaft 230 and rotated with the rotary shaft 230. A fastening plate 340 is coupled and fixed between the wave generator 310 and the rotary shaft 230, whereby the wave generator 310 and the rotary shaft 230 may be fixed to each other. The wave generator 310 may include a bearing.

The flex spline 330 is fitted on the outer circumferential surface of the wave generator 310, and may be elliptically bent by the wave generator 310. Teeth (first teeth) are formed on the outer circumferential surface of the flex spline 330, and when the flex spline 330 is rotated inside the circular spline 320, the teeth (the first teeth) formed on the outer circumferential surface of the flex spline 330 are engaged with teeth (second teeth) formed on the inner circumferential surface of the circular spline 320.

When the reducer 300 is a harmonic gearing, it may have a relatively large reduction gear ratio, there is no backlash, and the reducer 300 may be formed to be advantageous in terms of downsizing and light weighting.

The circular spline 320 may be coupled and fixed to the first body 110 (the first inner case 111), and the flex spline 330 may be coupled and fixed to the wheel 410 (a base 410a). Accordingly, when the motor 200 is operated, the wave generator 310 is rotated with the rotary shaft 230 and the flex spline 330 is rotated with the wheel 410 (the pulley 410b) with respect to the first body 110.

The wheel 410 is rotated about the first rotation axis S1 when the rotor 220 is rotated.

The wheel 410 is formed substantially in a circular shape around the first rotation axis S1.

The wheel 410 includes the base 410a and the pulley 410b. The base 410a and the pulley 410b may be integrated with each other, and are each formed in a circular shape around the first rotation axis S1.

The outer diameter of the base 410a may be larger than the outer diameter of the pulley 410b. The base 410a may be disposed closer to the motor 200 than the pulley 410b.

The base 410a of the wheel 410 is coupled and fixed to the flex spline 330 of the reducer 300.

A pulley hole 414 is formed through the center of the wheel 410. That is, the pulley hole 414 is formed through the centers of the base 410a and the pulley 410b.

A seat portion 411 is formed on the outer circumferential surface of the pulley 410b. The seat portion 411 is a recessed groove. The seat portion 411 is formed in an arc shape around the first rotation axis S1.

The seat portion 411 may form a complete circle (the angle range made by the seat portion 411 is 360°) in an embodiment, and the seat portion 411 may form a portion of a circle (the angle range made by the seat portion 411 is smaller than 360°) in another embodiment.

In an embodiment, the seat portion 411 may form a continuous arc around the first rotation axis S1. In another embodiment, the seat portion 411 may form a discontinuous arc (a plurality of arcs having the same radius of curvature and separated from each other) around the first rotation axis S1.

A fixing groove 413 may be formed in the pulley 410b.

The fixing groove 413 is a groove recessed toward the first rotation axis S1 from the seat portion 411. The fixing groove 413 is positioned closer to the first rotation axis S1 than the seat portion 411.

The wire 420 may be made of metal or may include metal. The wire 420 may include a steel wire, and may be formed by gathering or spirally combining a plurality of steel wires.

The wire 420 may be longitudinally stretched in a straight line when not coupled to the series elastic actuator 1, and the cross-section thereof may be uniform or substantially uniform in the longitudinal direction.

The wire 420 may be partially or entirely bent, across the entire section thereof.

The wire 420 has a center portion 422, a first extending portion 425, and a second extending portion 426. The wire 420 has a fixing portion 421, a first connecting portion 423, a second connection portion 424, a first bending portion 427, and a second bending portion 428.

The fixing portion 421, the center portion 422, the first connecting portion 423, and the second connection portion 424, and the first extending portion 425, the second extending portion 426, the first bending portion 427, and the second bending portion 428 are integrated with each other.

The wire 420 of the series elastic actuator 1 is entirely bent in a U-shape.

The center portion 422 forms a middle curve section of the wire 420 bending in a U-shape. The center portion 422 is inserted into the seat portion 411 in close contact with the pulley 410b. The center portion 422 fitted on the pulley 410b is bent with the same curvature as the curvature of the seat portion 411.

The center portion 422 is inserted into the seat portion 411 that is a recessed groove, thereby being fitted on the pulley 410b. Accordingly, the center portion 422 may be fitted on the pulley 410b without protruding in the radial direction of the pulley 410b. Therefore, interference between other components of the series elastic actuator 1 and the center portion 422 is prevented, separation of the center portion 422 from the pulley 410b is prevented, the wire 420 may be moved in a predetermined direction when the series elastic actuator 1 is operated, and a stable combination between the wire 420 and the pulley 410b is maintained, with sliding further prevented.

The fixing portion 421 may be the center portion of the wire 420. The center portion 422 is divided into two parts with the fixing portion 421 therebetween. That is, the center portion 422 extends to two sides from the fixing portion 421.

The fixing portion 421 is inserted into the fixing groove 413. The fixing portion 421 is inserted into the fixing groove 413 while being bent or curved at the center portion 422 differently from the curve (arc) of the center portion 422.

The series elastic actuator 1 includes a fixing pin 415. The fixing fin 415 is fastened and fixed in the fixing groove 413 of the pulley 410b.

The fixing portion 421 inserted into the fixing groove 413 is firmly fitted between the fixing pin 415 and the pulley 410b, so that the fixing portion 421 is fixed in the fixing groove 413 of the pulley 410b. The fixing portion 421 of the wire 420 is fixed to the wheel 410 without separating from the fixing groove 413 of the pulley 410b.

The first extending portion 425 extends from any one end of the center portion 422, and the second extending portion 426 extends from the other end of the center portion 422.

The first extending portion 425 and the second extending portion 426 extend to opposite sides with the fixing portion 421 and the center portion 422 therebetween.

The first extending portion 425 and the second extending portion 426 are formed to be straight.

The first extending portion 425 and the second extending portion 426 may be parallel to each other.

The first extending portion 425 and the second extending portion 426 may be parallel to a direction perpendicular to the direction of the first rotation axis S1. The first extending portion 425 and the second extending portion 426 may be parallel to a first direction X.

The first extending portion 425 and the second extending portion 426 may be spaced apart from each other in a second direction Y. The gap between the first extending portion 425 and the second extending portion 426 may be the same as the diameter 2r of the arc made by the seat portion 411.

The first rotation axis S1 may be parallel to the third direction Z.

The first connecting portion 423 is a portion connecting the center portion 422 and the first extending portion 425. That is, the center portion 422, the first connecting portion 423, and the first extending portion 425 are sequentially connected.

For operation of the series elastic actuator 1, the first connecting portion 423 may be straight or may be curved, or a portion thereof may be straight and the other portion thereof may be curved.

The second connecting portion 424 is a portion connecting the center portion 422 and the second extending portion 426. That is, the center portion 422, the second connecting portion 424, and the second extending portion 426 are sequentially connected.

For operation of the series elastic actuator 1, the second connecting portion 424 may be straight or may be curved, or a portion thereof may be straight and the other portion thereof may be curved.

The first bending portion 427 extends from the first extending portion 425 and forms any one end of the wire 420, and the second bending portion 428 extends from the second extending portion 426 and forms the other end of the wire 420.

The first bending portion 427 bends from the first extending portion 425, and the second bending portion 428 bends from the second extending portion 426.

The series elastic actuator 1 may include a first adjustment housing 550 and a second adjustment housing 650.

The first adjustment housing 550 is a container open to the outside. The first adjustment housing 550 may be a container open in a direction parallel to the first direction X.

A hole 551 is formed through the first adjustment housing 550 in the first direction X, and the first extending portion 425 of the wire 420 is inserted into and passed through the first adjustment housing 550 through the hole 551.

In an embodiment, the first adjustment housing 550 may be coupled and fixed to the second body 120.

The second adjustment housing 650 is a container open to the outside. The second adjustment housing 650 may be a container open in a direction parallel to the first direction X.

A hole 651 is formed through the second adjustment housing 650 in the first direction X, and the second extending portion 426 of the wire 420 is inserted into and passed through the second adjustment housing 650 through the hole 651.

In an embodiment, the second adjustment housing 650 may be coupled and fixed to the second body 120.

The first adjustment housing 550 and the second adjustment housing 650 may be formed in the same manner as each other, or may be symmetric to each other.

The first spring 560 and the second spring 660 may be coil springs. The first spring 560 and the second spring 660 may have the same size, material, and shape as each other. The first spring 560 and the second spring 660 may have the same spring constant.

The first spring 560 is accommodated in the first adjustment housing 550 and the second spring 660 is accommodated in the second adjustment spring 650.

The first adjuster 500 is coupled to the first extending portion 425 so as to move with the first extending portion 425. The first adjuster 500 may be coupled and fixed to the first extending portion 425.

The first adjuster 500 includes a first tensioner 510, a first wire-fixing member 520, and a first adjustment nut 530. The first adjuster 500 may include a first auxiliary nut 540.

The first tensioner 510 has a first neck 511, a first head 513, and a first center hole 515.

The first neck 511 is elongated in a direction parallel to the first direction X, and has a substantially uniform cross-section in the first direction X. The first neck 511 has a thread on the outer circumferential surface thereof. A portion of the first neck 511 is disposed in the first adjustment housing 550 and fitted in the center of the first spring 560 that is a coil spring.

The first head 513 is formed such that the diameter thereof increases outside the first neck 511.

The first center hole 515 is a hole formed through the center of the first tensioner 510 in a direction parallel to the first direction X. That is, the first center hole 515 is a hole formed through the first neck 511 and the first head 513.

The first extending portion 425 of the wire 420 is inserted into the first center hole 515 and fixed to the first tensioner 510.

The first wire-fixing member 520 is disposed outside the first head 513 of the first tensioner 510 and is coupled and fixed to the first head 513. When the first wire-fixing member 520 and the first head 513 are combined, the first bending portion 427 of the wire 420 is pressed and interposed between the first wire-fixing member 520 and the first head 513, whereby the first bending portion 427 of the wire 420 and the first adjuster 500 are fixed to each other.

A first slot 513a, which is a recessed groove, may be formed on the outer circumferential surface of the first head 513 in a direction perpendicular to the first direction X. The first bending portion 427 may be inserted into the first slot 513a, and in this state, the first bending portion 427 of the wire 420 may be pressed and fixed between the first wire-fixing member 520 and the first head 513.

The first adjustment nut 530 is formed substantially in a nut shape, and is screwed on the outer circumferential surface of the first neck 511.

A portion of the first adjustment nut 530 is inserted into the first adjustment housing 550, and the outer circumferential surface of the first adjustment nut 530 is in close contact with the inner circumferential surface of the first adjustment housing 550.

The first adjustment nut 530 may be moved (reciprocate) with respect to the first adjustment housing 550 in a direction parallel to the first direction X.

The first spring 560 accommodated in the first adjustment housing 550 has one end thereof supported by the inner surface of the first adjustment housing 550 and the other end thereof supported in contact with the first adjustment nut 530. When the first adjustment nut 530 is rotated with respect to the first neck 511, the first neck 511 is moved in a direction parallel to the first direction X, whereby it is possible to adjust the degree of compression of the first spring 560 and the tension of the wire 420 (the first connecting portion 423, the first extending portion 425, etc.). In this case, the first tensioner 510 is not rotated, so twisting of the wire 420 (the first connecting portion 423, the first extending portion 425, etc.) is prevented.

The first auxiliary nut 540 is formed in a nut shape, and may be screwed on the outer circumferential surface of the first neck 511. The first auxiliary nut 540 may be fitted on the first neck 511 in close contact with the first adjustment nut 530. Accordingly, thread-loosening between the first adjustment nut 530 and the first neck 511 may be prevented, and the first adjustment nut 530 may be stably fitted on the first neck 511.

The first spring 560 is coupled to the first adjuster 500 and the first adjustment housing 550 in a pre-pressed state. The first spring 560, which is a coil spring, is coupled to the first adjuster 500 and the first adjustment housing 550 with a predetermined portion compressed, and accordingly, a predetermined tension acts on the center portion 422, the first connecting portion 423, and the first extending portion 425 of the wire 420.

The second adjuster 600 is coupled to the second extending portion 426 so as to move with the second extending portion 426. The second adjuster 600 is coupled and fixed to the second extending portion 426.

The second adjuster 600 includes a second tensioner 610, a second wire-fixing member 620, and a second adjustment nut 630. The second adjuster 600 may include a second auxiliary nut 640.

The second tensioner 610 has a second neck 611, a second head 613, and a second center hole 615.

The second neck 611 is elongated in a direction parallel to the first direction X, and has a substantially uniform cross-section in the first direction X. The second neck 611 has a thread on the outer circumferential surface thereof. A portion of the second neck 611 is disposed in the second adjustment housing 650 and fitted in the center of the second spring 660, which is a coil spring.

The second head 613 is formed such that the diameter thereof increases outside the second neck 611.

The second center hole 615 is a hole formed through the center of the second tensioner 610 in a direction parallel to the first direction X. That is, the second center hole 615 is a hole formed through the second neck 611 and the second head 613.

The second extending portion 426 of the wire 420 is inserted into the second center hole 615 and fixed to the second tensioner 610.

The second wire-fixing member 620 is disposed outside the second head 613 of the second tensioner 610 and is coupled and fixed to the second head 613. When the second wire-fixing member 620 and the second head 613 are combined, the second bending portion 428 of the wire 420 is pressed and interposed between the second wire-fixing member 620 and the second head 613, whereby the second bending portion 428 of the wire 420 and the second adjuster 600 are fixed to each other.

A second slot 613a, which is a recessed groove, may be formed on the outer circumferential surface of the second head 613 in a direction perpendicular to the first direction X. The second bending portion 428 may be inserted into the second slot 613a, and in this state, the second bending portion 428 of the wire 420 may be pressed and fixed between the second wire-fixing member 620 and the second head 613.

The second adjustment nut 630 is formed substantially in a nut shape, and is screwed on the outer circumferential surface of the second neck 611.

A portion of the second adjustment nut 630 is inserted into the second adjustment housing 650, and the outer circumferential surface of the second adjustment nut 630 is in close contact with the inner circumferential surface of the second adjustment housing 650. The second adjustment nut 630 may be moved (reciprocate) with respect to the second adjustment housing 650 in a direction parallel to the first direction X.

The second spring 660 accommodated in the second adjustment housing 650 has one end thereof supported by the inner surface of the second adjustment housing 650 and the other end thereof supported in contact with the second adjustment nut 630. When the second adjustment nut 630 is rotated with respect to the second neck 611, the second neck 611 is moved in a direction parallel to the first direction X, whereby it is possible to adjust the degree of compression of the second spring 660 and the tension of the wire 420 (the second connecting portion 424, the second extending portion 426, etc.). In this case, the second tensioner 610 is not rotated, so twisting of the wire 420 (the second connecting portion 424, the second extending portion 426, etc.) is prevented.

The second auxiliary nut 640 is formed in a nut shape, and may be screwed on the outer circumferential surface of the second neck 611. The second auxiliary nut 640 may be fitted on the second neck 611 in close contact with the second adjustment nut 630. Accordingly, thread-loosening between the second adjustment nut 630 and the second neck 611 may be prevented, and the second adjustment nut 630 may be stably fitted on the second neck 611.

The second spring 660 is coupled to the second adjuster 600 and the second adjustment housing 650 in a pre-pressed state. The second spring 660, which is a coil spring, is coupled to the second adjuster 600 and the second adjustment housing 650 with a predetermined portion compressed, and accordingly, a predetermined tension acts in the center portion 422, the second connecting portion 424, and the second extending portion 426 of the wire 420.

The first bearing 130 and the second bearing 140 each have the first rotation axis S1 as their central axes.

The first bearing 130 is coupled between the first housing 111, 112 and the first outer case 121. In particular, the first bearing 130 is coupled between the first inner case 111 and the first outer case 121. The first bearing 130 enables smooth relative rotation between the first body 110 and the second body 120.

The second bearing 140 is coupled between the pulley 410b and the second outer case 122, and enables smooth relative rotation between the pulley 410b and the second body 120. The second bearing 140 may be coupled to the pulley 410b by being inserted into the pulley hole 414 of the pulley 410b.

The first bearing 130 and the second bearing 140 support relative rotation of the first body 110 and the second body 120 outside the motor 200 and the reducer 300 in the direction of the first rotation axis S1. Since the first bearing 130 and the second bearing 140 support relative rotation of the first body 110 and the second body 120 outside the motor 200 generating torque and the reducer 300 transmitting torque, the first body 110 and the second body 120 may stably rotate with respect to each other.

The encoders 150 and 160 described in embodiments of the present disclosure may be common encoders. An encoder is an electronic device that measures motion or position. The encoders measure whether specific components are rotated, rotational angles thereof, etc. in embodiments of the present disclosure.

The encoders described in embodiments of the present disclosure may be optical sensors that provide an electrical signal in a pulse train form. The encoders described in an embodiment of the present disclosure may be rotary encoders, and may measure a rotation angle about a rotation axis.

The first encoder 150 may be fixed to the first housing 111, 112 so as to sense rotation of the rotor 220 or the rotary shaft 230 that is rotated about the first rotation axis S1.

The second encoder 160 may be disposed inside the second outer case 122 so as to measure the relative rotation angle between the pulley 410b and the second body 120 that are rotated about the first rotation axis S1. In an embodiment, the second encoder 160 may be fixed inside the second outer case 122 so as to measure the rotation angle of the pulley 410b that is rotated with respect to the second body 120.

The series elastic actuator 1 may include a controller 101, or may be combined with a separate controller 101.

The controller 101 may include a device that can process data or may include computer programs. The controller 101 may include a central processing unit of a computer system.

The controller 101 may be connected with the motor 200 to control operation of the motor 200.

The controller 101 is connected with the first encoder 150 and the second encoder 160, and receives information from the first encoder 150 and the second encoder 160.

The controller 101 may identify the rotation angle of the second body 120 with respect to the first body 110 on the basis of information provided from the first encoder 150 and the second encoder 160, and may identify the relative rotation angle between the pulley 410b and the second body 120.

When the motor 200 is operated in the series elastic actuator 1, the second body 120 is rotated with the pulley 410b. That is, the second body 120 and the pulley 410b combined by the wire 420, the first adjuster 500, and the second adjuster 600 are rotated with respect to the first body 110, and in this case, relative rotation between the second body 120 and the pulley 410b may not be generated.

When the motor 200 is not operated in the series elastic actuator 1 and a specific external force is applied to the series elastic actuator 1, the second body 120 may be rotated with respect to the pulley 410b and the first body 110, which will be described below.

Figure 6:
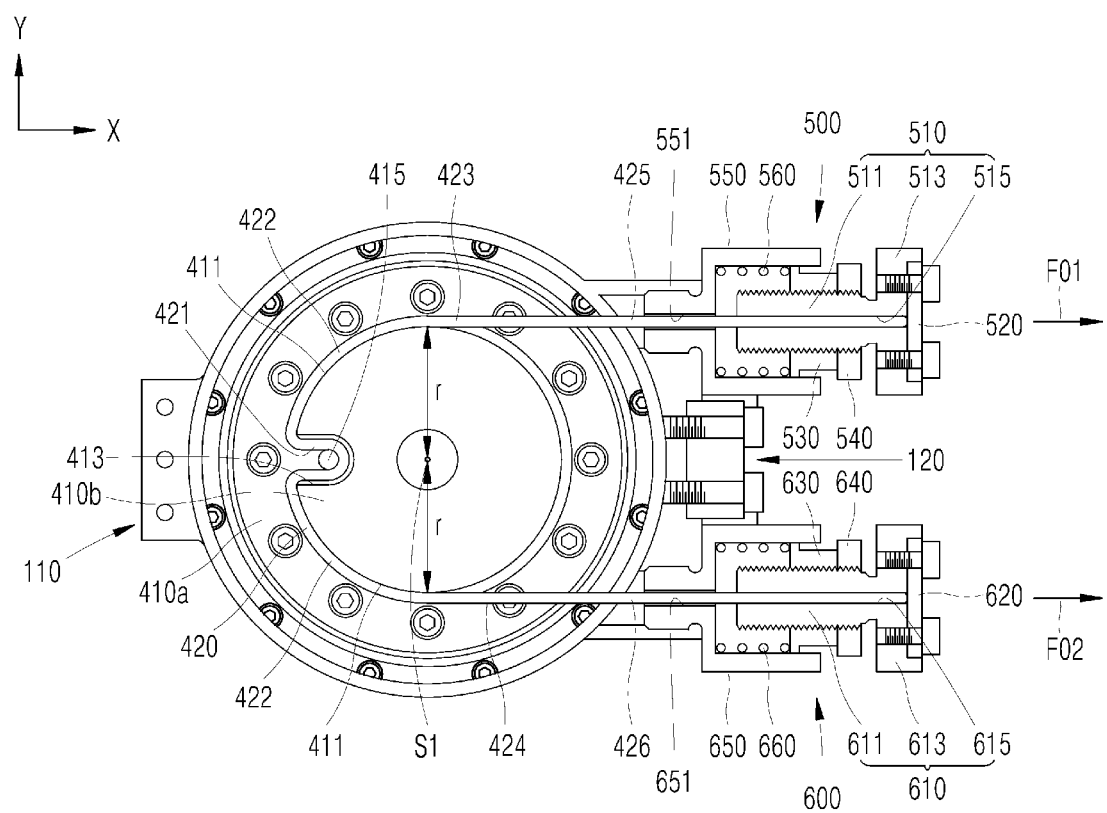
FIG. 6 is a cross-sectional view showing a series elastic actuator in a state in which a specific external force is not applied.

FIG. 6 is a cross-sectional view showing the series elastic actuator 1 in a state in which a specific external force is not applied.

Figure 7A:
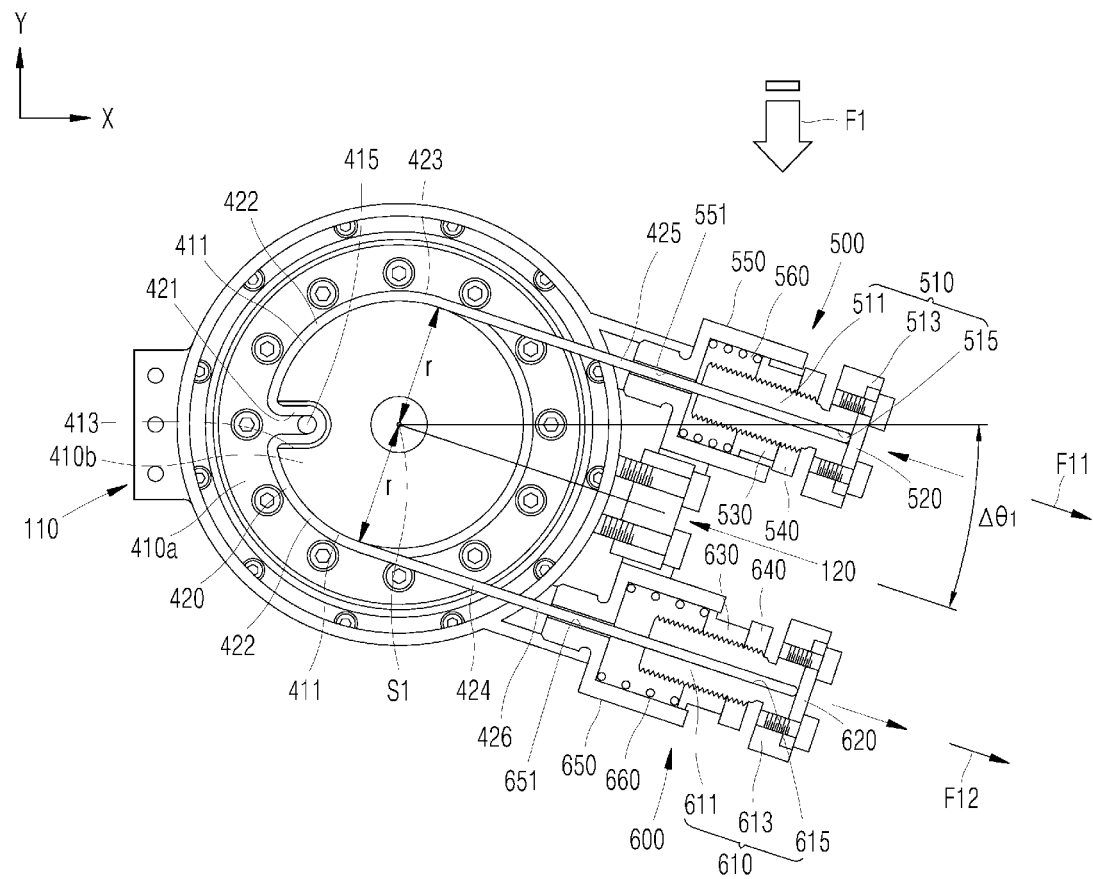
FIG. 7A is a cross-sectional view showing a state in which an external force is applied to rotate a second body clockwise with respect to a first body in the series elastic actuator of FIG. 6.
Figure 7B:
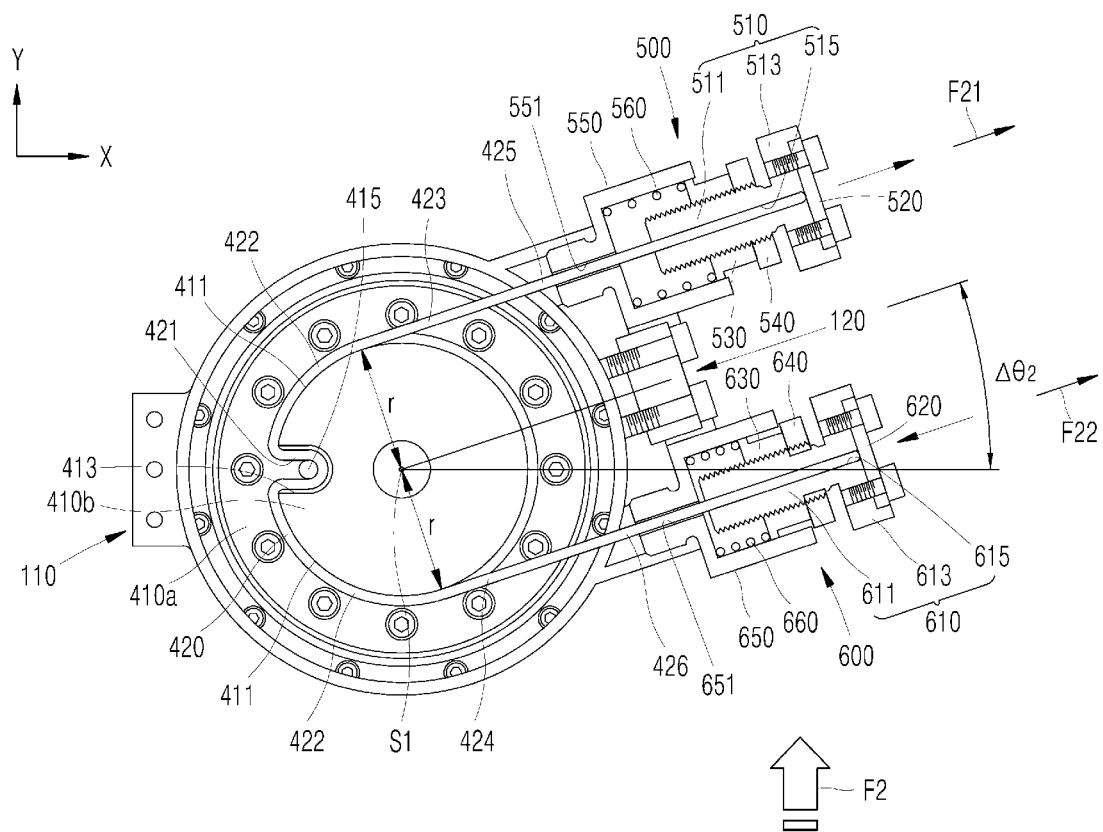
FIG. 7B is a cross-sectional view showing a state in which an external force is applied to rotate the second body counterclockwise with respect to a first body in the series elastic actuator of FIG. 6.

FIG. 7A is a cross-sectional view showing a state in which an external force is applied to rotate the second body 120 clockwise with respect to the first body 110 in the series elastic actuator 1 of FIG. 6 and FIG. 7B is a cross-sectional view showing a state in which an external force is applied to rotate the second body 120 counterclockwise with respect to the first body 110 in the series elastic actuator 1 of FIG. 6.

The first spring 560 and the second spring 660 are assembled under pre-pressure even when a specific external force is not applied, as shown in FIG. 6.

The first spring 560 may be compressed by x0 and coupled between the first adjuster 500 and the first adjustment housing 550, and the second spring 660 may also be compressed by x0 and coupled between the second adjuster 600 and the second adjustment housing 650.

Assuming that the spring constants of the first spring 560 and the second spring 660 are k, respectively, the first spring 560 keeps an elasticity of k·x0 and the second spring 660 also keeps an elasticity of k·x0.

If the friction between the first adjustment nut 530 and the first adjustment housing 550 is ignored, a tension F01 acting on the first extending portion 425 is k·x0.

If the friction between the second adjustment nut 630 and the second adjustment housing 650 is ignored, a tension F02 acting on the second extending portion 426 is k·x0.

Assuming that the radius from the first rotation axis S1 to the arc formed by the seat portion 411 is r, a torque T1 acting around the first rotation axis S1 may be expressed as in the following [Formula 1].

$$\tau 1 = F01 \cdot r + F02 \cdot r \qquad \text{[Formula 1]}$$

Since F01 and F02 have the same magnitude and act in opposite directions, the torque T1 acting around the first rotation axis S1 is 0.

As shown in FIG. 7A, when an external force F1 is applied to rotate the second body 120 clockwise by a predetermined angle $\Delta\theta 1$ with respect to the first body 110 in the state shown in FIG. 6, the first spring 560 is compressed and the second spring 660 is stretched.

In the series elastic actuator 1 according to an embodiment of the present disclosure, since the center portion 422 of the wire 420 is accommodated in the seat portion 411, which is a recessed groove, and the fixing portion 421 of the wire 420 is stably fixed in the fixing groove 413, when the second body 120 is rotated with respect to the first body 110, sliding between the wire 420 and the pulley 410b is prevented.

The first connecting portion 423 of the wire 420 comes in close contact with the seat portion 411 by $\Delta\theta 1 \cdot r$ and the first extending portion 425 is moved by $\Delta\theta 1 \cdot r$. That is, the length of the portion forming the straight section of the wire 420 at the first extending portion 425 is decreased by $\Delta\theta 1 \cdot r$.

At the portion connected to the second connecting portion 424, the center portion 422 of the wire 420 is moved away from the seat portion 411 by $\Delta\theta 1 \cdot r$ and the second extending portion 426 is moved by $\Delta\theta 1 \cdot r$. That is, the length of the portion forming the straight section of the wire 420 at the second extending portion 426 is increased by $\Delta\theta 1 \cdot r$.

Assuming that $\Delta\theta 1 \cdot r$ is x1, the first spring 560 is compressed by x0+x1 and the second spring 660 is compressed by x0-x1 (x0>x1). That is, the first spring 560 is further compressed by x1 and the second spring 660 is less compressed by x1.

In this case, the first spring 560 keeps an elasticity of k(x0+x1) and the second spring 660 keeps an elasticity of k(x0-x1).

If the friction between the first adjustment nut 530 and the first adjustment housing 550 is ignored, the tension F1t acting in the first extending portion 425 is k(x0+x1). Further, if the friction between the second adjustment net 630 and the second adjustment housing 650 is ignored, the tension F12 acting in the second extending portion 426 is k(x0-x1).

A torque τ2 acting around the first rotation axis S1 may be expressed as in the following [Formula 2].

$$\tau 2 = F11 \cdot r + F12 \cdot r \qquad \text{[Formula 2]}$$

Since F11 and F12 act in opposite directions, the torque T2 may be expressed as in the following [Formula 3].

$$\tau 2 = k(x0+x1)r - k(x0-x1)r \qquad \text{[Formula 3]}$$

Accordingly, the torque τ2 is 2k·x1·r.

As shown in FIG. 7B, when an external force F2 is applied to rotate the second body 120 counterclockwise by a predetermined angle $\Delta\theta 2$ with respect to the first body 110 in the state shown in FIG. 6, the first spring 560 is stretched and the second spring 660 is compressed.

The center portion 422 of the wire 420 connected with the first connecting portion 423 is moved away from the seat portion 411 by $\Delta\theta 2 \cdot r$ and the first extending portion 425 is moved by $\Delta\theta 2 \cdot r$. That is, the length of the portion forming the straight section of the wire 420 at the first extending portion 425 is increased by $\Delta\theta 2 \cdot r$.

The second connecting portion 424 of the wire 420 comes in close contact with the seat portion 411 by $\Delta\theta 2 \cdot r$ and the second extending portion 426 is moved by $\Delta\theta 2 \cdot r$. That is, the length of the portion forming the straight section of the wire 420 at the second extending portion 426 is decreased by $\Delta\theta 2 \cdot r$.

Assuming that $\Delta\theta 2 \cdot r$ is x2, the first spring 560 is compressed by x0-x2 and the second spring 660 is compressed by x0+x2 (x0>x2). That is, the first spring 560 is less compressed by x2 and the second spring 660 is further compressed by x2.

In this case, the first spring 560 keeps an elasticity of k(x0-x2) and the second spring 660 keeps an elasticity of k(x0+x2).

If the friction between the first adjustment nut 530 and the first adjustment housing 550 is ignored, the tension F21 acting in the first extending portion 425 is k(x0-x2). Further, if the friction between the second adjustment net 630 and the second adjustment housing 650 is ignored, the tension F22 acting in the second extending portion 426 is k(x0+x2).

A torque τ3 acting around the first rotation axis S1 may be expressed as in the following [Formula 4].

$$\tau 3 = F21r + F22 \cdot r \qquad \text{[Formula 4]}$$

Since F21 and F22 act in opposite directions, the torque τ3 may be expressed as in the following [Formula 5].

$$\tau 3 = -k(x0-x2)r + k(x0+x2)r \qquad \text{[Formula 5]}$$

Accordingly, the torque τ3 is 2k·x2·r.

Since the spring constants of the first spring 560 and the second spring 660 may be known in advance, and the relative rotation angle of the second body 120 with respect to the first body 110 may be obtained by the first encoder 150, it is possible to easily and accurately derive the acting torque.

When torque is generated around the first rotation axis S1 in the series elastic actuator 1 according to an embodiment of the present disclosure, the moment arm r is constant, the angle by relative rotation of the second body 120 with respect to the first body 110 may be directly measured, and the torque may be accurately and easily measured.

In an embodiment of the present disclosure, it is possible to adjust the degree of compression of the first spring 560 by rotating the first tensioner 510 with respect to the first adjustment nut 530 in the first adjuster 500, and it is possible to measure the degree of compression of the second spring 660 by rotating the second tensioner 610 with respect to the second adjustment nut 630 in the second adjuster 600. Accordingly, it is possible to adjust the magnitudes of the tension acting in the first extending portion 425 and the second extending portion 426 of the wire 420 to be the same as each other, and it is also possible to adjust the magnitudes to be different from each other.

It is possible to measure the acting torque by checking the relative rotation angle between the pulley 410b and the second body 120 by adjusting the first adjuster 500 and the second adjuster 600 so that the magnitudes of the tension acting in the first extending portion 425 and the second extending portion 426 of the wire 420 are the same as each other, without a specific external force being applied to the series elastic actuator 1.

Figure 8:
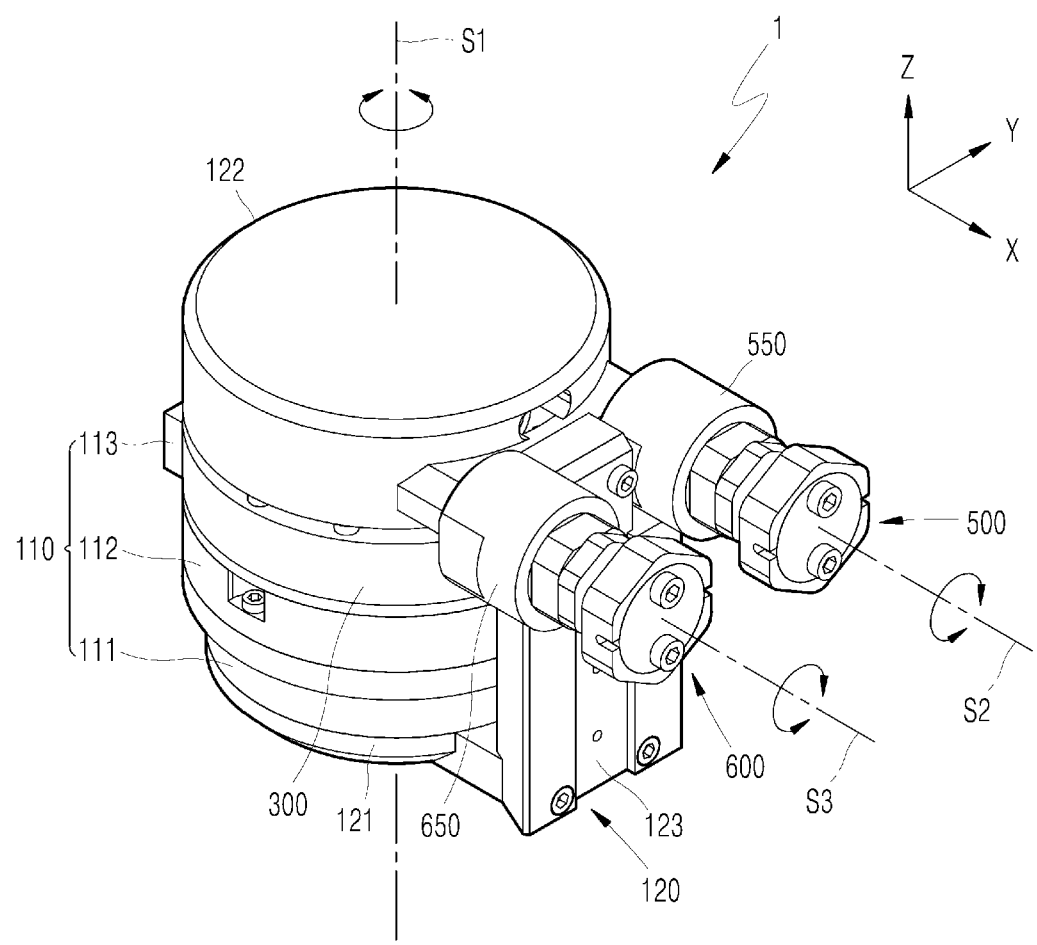
FIG. 8 is a perspective view showing a series elastic actuator according to an embodiment of the present disclosure.
Figure 9:
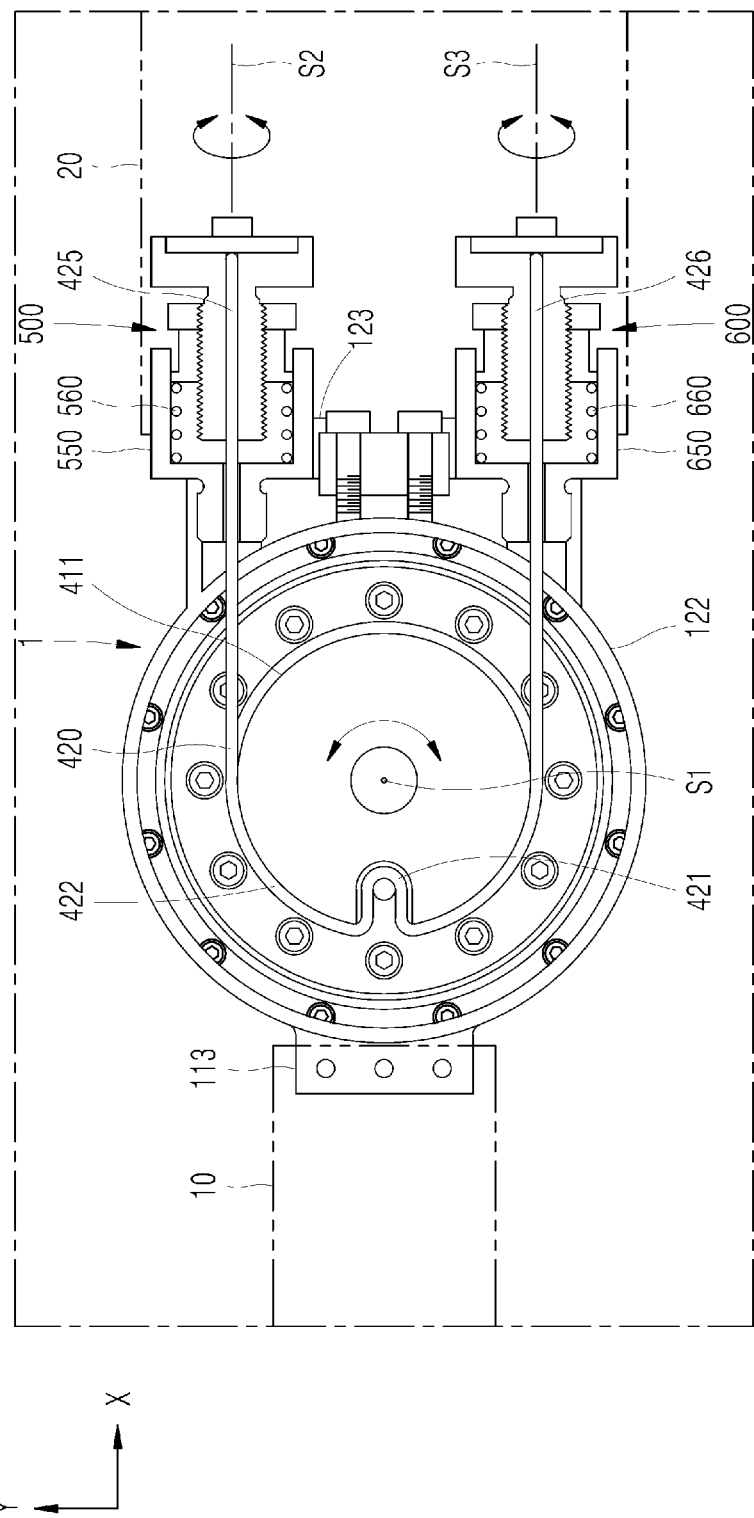
FIG. 9 is a cross-sectional view schematically showing a use state of the series elastic actuator shown in FIG. 8.

FIG. 8 is a perspective view showing a series elastic actuator 1 according to an embodiment of the present disclosure and FIG. 9 is a cross-sectional view schematically showing a use state of the series elastic actuator 1 shown in FIG. 8.

In an embodiment, the first adjustment housing 550 may be fixed to the second body 120 so as to be rotatable about a second rotation axis S2, which is an extension line from the first extending portion 425.

In an embodiment, the second adjustment housing 650 may be fixed to the second body 120 so as to be rotatable about a third rotation axis S3, which is an extension line from the second extending portion 426.

The first adjuster 500 may be rotated about the second rotation axis S2 and the second adjuster 600 may be rotated about the third rotation axis S3.

Even when the first extending portion 425 is partially rotated about the second rotation axis S2, the tension acting in the first extending portion 425 may be maintained constant, and the coupling relationship of the second body 120, the first extending portion 425, the first adjuster 500, and the first adjustment housing 550 is maintained as is.

Even when the second extending portion 426 is partially rotated about the third rotation axis S3, the tension acting in the second extending portion 426 may be maintained constant, and the coupling relationship of the second body 120, the second extending portion 426, the second adjuster 600, and the second adjustment housing 650 is maintained as is.

That is, even when the first extending portion 425, the first adjuster 500, or the first adjustment housing 550 is rotated about the second rotation axis S2, or even when the second extending portion 426, the second adjuster 600, or the second adjustment housing 650 is rotated about the third rotation axis S3, measurement of the torque is not influenced, and an accurate torque can be measured when an external force is applied.

In the series elastic actuator 1 according to an embodiment of the present disclosure, the first adjuster 500 or the first adjustment housing 550 may not be rotationally symmetric about the first extending portion 425 (the second rotation axis S2). Further, the second adjuster 600 or the second adjustment housing 650 may not be rotationally symmetric about the second extending portion 426 (the third rotation axis S3).

In order to prevent interference with other devices and limitation in a use range or available range when the series elastic actuator 1 is coupled to an arm of a robot to be used, the first adjuster 500 or the first adjustment housing 550 may be partially rotated about the second rotation axis S2, and the second adjuster 600 or the second adjustment housing 650 may be partially rotated about the third rotation axis S3.

According to the series elastic actuator 1 of an embodiment of the present disclosure, as described above, it is possible to remove or reduce limitations in terms of installation, assembly, etc. of a rotary series elastic actuator 1, and to measure an accurate torque.

Although specific embodiments of the present disclosure were described above with reference to the drawings, the present disclosure is not limited thereto, and it should be understood that the present disclosure may be changed and modified by those skilled in the art in various ways through more detailed embodiments without departing from the spirit and scope of the present disclosure. Accordingly, the range of the present disclosure should be defined not by the embodiments described above, but by the spirit described in the claims.

What is claimed is:

1. A series elastic actuator, comprising:
a first body;
a motor comprising a stator and a rotor, the stator being fixed to the first body;
a pulley configured to be rotated about a first rotation axis when the rotor is rotated, the pulley having a seat portion forming an arc around the first rotation axis;
a second body configured to be rotatable about the first rotation axis;
a wire having a center portion curved around the seat portion, and a first extending portion and a second extending portion respectively extending in a straight line from each end of the center portion;
a first adjuster coupled to the first extending portion so as to move with the first extending portion;
a second adjuster coupled to the second extending portion so as to move with the second extending portion;
a pre-pressed first spring configured to elastically support the first adjuster from the second body such that the wire is pulled; and
a pre-pressed second spring configured to elastically support the second adjuster from the second body such that the wire is pulled
wherein the first adjuster comprises:
a first tensioner having a first neck inserted into the first spring that is a coil spring, a first head formed such that a diameter of the first head increases outside the first neck, and a first center hole formed through the first neck and the first head such that the first extending portion is inserted into the first center hole;
a first wire-fixing member fastened to the first head while pressing an end portion of the wire such that the wire inserted into the first center hole and protruding out of the first head is fixed to the first head; and
a first adjustment nut screwed to an outer circumferential surface of the first neck and configured to support the first spring, and
wherein the second adjuster comprises:
a second tensioner having a second neck inserted into the second spring that is a coil spring, a second head formed such that a diameter of the second head increases outside the second neck, and a second center hole formed through the second neck and the second head such that the second extending portion is inserted into the second center hole;
a second wire-fixing member fastened to the second head while pressing an end portion of the wire such that the wire inserted into the second center hole and protruding out of the second head is fixed to the second head; and
a second adjustment nut screwed to an outer circumferential surface of the second neck and configured to support the second spring.

2. The series elastic actuator of claim 1, wherein the first extending portion and the second extending portion are parallel to each other.

3. The series elastic actuator of claim 1, wherein
the pulley comprises a fixing groove recessed toward the first rotation axis on the seat portion,
the wire has a fixing portion inserted into the fixing groove at a center of the center portion, and the series elastic actuator comprises a fixing pin fastened to the pulley at the fixing groove in close contact with the fixing portion such that the fixing portion is fixed in the fixing groove.

4. The series elastic actuator of claim 1, further comprising:
a first adjustment housing coupled to the second body, wherein the first extending portion passes through a center of the first adjustment housing, and wherein the first adjustment housing is configured to accommodate the first spring, the first neck, and the first adjustment nut; and
a second adjustment housing coupled to the second body, wherein the second extending portion passes through a center of the second adjustment housing, and wherein the second adjustment housing is configured to accommodate the second spring, the second neck, and the second adjustment nut.

5. The series elastic actuator of claim 4, wherein
the first adjustment housing is coupled to the second body so as to be rotatable about the first extending portion, and
the second adjustment housing is coupled to the second body so as to be rotatable about the second extending portion.

6. The series elastic actuator of claim 1, further comprising a harmonic gearing,
wherein the harmonic gearing is a reducer connecting the rotor and the pulley, and the harmonic gearing has the first rotation axis as a central axis.

7. The series elastic actuator of claim 1, wherein
the first body comprises a first housing configured to accommodate the motor,
the second body comprises:
a first outer case positioned at any one side of the first housing, at an opposite side to the pulley with respect to the first housing; and
a second outer case positioned at an opposite side to the first outer case with respect to the pulley, the second outer case being fixedly coupled to the first outer case, and
the series elastic actuator further comprises:
a first bearing coupled between the first housing and the first outer case; and
a second bearing coupled between the pulley and the second outer case.

8. The series elastic actuator of claim 7, further comprising a first encoder,
wherein the first encoder is fixed to the first housing and configured to sense rotation of the rotor.

9. The series elastic actuator, comprising:
a first body;
a motor comprising a stator and a rotor, the stator being fixed to the first body;
a pulley configured to be rotated about a first rotation axis when the rotor is rotated, the pulley having a seat portion forming an arc around the first rotation axis;
a second body configured to be rotatable about the first rotation axis;
a wire having a center portion curved around the seat portion, and a first extending portion and a second extending portion respectively extending in a straight line from each end of the center portion;
a first adjuster coupled to the first extending portion so as to move with the first extending portion;
a second adjuster coupled to the second extending portion so as to move with the second extending portion;
a pre-pressed first spring configured to elastically support the first adjuster from the second body such that the wire is pulled; and
a pre-pressed second spring configured to elastically support the second adjuster from the second body such that the wire is pulled
wherein
the first body comprises a first housing configured to accommodate the motor,
the second body comprises:
a first outer case positioned at any one side of the first housing, at an opposite side to the pulley with respect to the first housing; and
a second outer case positioned at an opposite side to the first outer case with respect to the pulley, the second outer case being fixedly coupled to the first outer case, and
wherein the series elastic actuator further comprises:
a first bearing coupled between the first housing and the first outer case;
a second bearing coupled between the pulley and the second outer case;
a first encoder fixed to the first housing and configured to sense rotation of the rotor; and
a second encoder disposed inside the second outer case and configured to measure a rotation angle between the pulley and the second body.

* * * * *